(12) United States Patent
Weaver et al.

(10) Patent No.: US 7,584,620 B2
(45) Date of Patent: Sep. 8, 2009

(54) SUPPORT SYSTEM FOR TRANSITION DUCTS

(75) Inventors: Adam Weaver, Oviedo, FL (US); Jody Wilson, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 499 days.

(21) Appl. No.: 11/249,790

(22) Filed: Oct. 13, 2005

(65) Prior Publication Data
US 2006/0288707 A1   Dec. 28, 2006

Related U.S. Application Data

(63) Continuation-in-part of application No. 11/167,464, filed on Jun. 27, 2005.

(51) Int. Cl.
*F02C 7/20* (2006.01)
(52) U.S. Cl. .................. 60/796; 60/39.37; 60/752
(58) Field of Classification Search ............. 60/39.37, 60/796, 798, 800, 752; 285/124.5, 124.2
See application file for complete search history.

(56) References Cited

U.S. PATENT DOCUMENTS

| | | | |
|---|---|---|---|
| 2,567,079 A | 9/1951 | Owner et al. | |
| 3,238,718 A | 3/1966 | Hill | |
| 3,609,968 A * | 10/1971 | Mierley, Sr. et al. | ........... 60/799 |
| 3,657,882 A | 4/1972 | Hugoson | |
| 3,657,884 A | 4/1972 | Hugoson | |
| 3,750,398 A * | 8/1973 | Adelizzi et al. | ............ 60/39.37 |
| 3,965,066 A | 6/1976 | Sterman et al. | |
| 4,016,718 A | 4/1977 | Lauck | |
| 4,060,337 A | 11/1977 | Bell | |
| 4,422,288 A | 12/1983 | Steber | |
| 4,640,092 A | 2/1987 | Coburn et al. | |
| 5,016,818 A | 5/1991 | Nash et al. | |

(Continued)

FOREIGN PATENT DOCUMENTS

DE        847 091        8/1952

(Continued)

OTHER PUBLICATIONS

Office Action dated Apr. 9, 2008 in U.S. Appl. No. 11/167,464.

(Continued)

*Primary Examiner*—Ted Kim

(57) ABSTRACT

Aspects of the invention relate to a system for supporting the exit end of a transition duct. The system includes a plurality of support ring segments that collectively form an annular support ring assembly. Each support ring segment can have an outer span and an inner span that are joined by a central column. Lateral openings can be defined on each side of the central column. The lateral openings of two adjacent support ring segments can cooperate to form an opening. An outlet region of a transition duct can be inserted into a respective opening and engage seals provided along the opening. The interface of adjacent ring segments occurs along an imaginary line across the outlet of the common transition duct body. Each support ring segment can be attached to the transition duct as well as to a fixed portion of the engine such as the turbine stationary support structure.

17 Claims, 8 Drawing Sheets

U.S. PATENT DOCUMENTS

| | | | |
|---|---|---|---|
| 5,337,583 A | 8/1994 | Giles et al. | |
| 5,400,586 A | 3/1995 | Bagepalli et al. | |
| 5,414,999 A | 5/1995 | Barnes | |
| 5,572,863 A * | 11/1996 | Wrightham et al. | 60/39.37 |
| 5,664,415 A | 9/1997 | Terrier | |
| 5,706,646 A | 1/1998 | Wilde et al. | |
| 5,761,898 A | 6/1998 | Barnes et al. | |
| 5,946,902 A | 9/1999 | Schuetz et al. | |
| 6,021,637 A | 2/2000 | Scavo | |
| 6,120,249 A | 9/2000 | Hultgren et al. | |
| 6,148,604 A | 11/2000 | Salt et al. | |
| 6,442,946 B1 | 9/2002 | Kraft et al. | |
| 6,644,032 B1 | 11/2003 | Jorgensen et al. | |
| 6,662,567 B1 | 12/2003 | Jorgensen | |
| 6,823,676 B2 | 11/2004 | Conete et al. | |
| 7,311,790 B2 | 12/2007 | Morrison et al. | |
| 2002/0112483 A1 | 8/2002 | Kondo et al. | |
| 2003/0154719 A1 | 8/2003 | Nishi et al. | |
| 2006/0242965 A1 | 11/2006 | Shi et al. | |

FOREIGN PATENT DOCUMENTS

| | | |
|---|---|---|
| EP | 0 718 468 A1 | 6/1996 |
| FR | 1 007 743 | 5/1952 |
| JP | 58208519 A | 12/1983 |
| JP | 01-155120 * | 6/1989 |

OTHER PUBLICATIONS

Amendment dated Jul. 9, 2008 in U.S. Appl. No. 11/167,464.
Final Office Action dated Sep. 22, 2008 issued in U.S. Appl. No. 11/167,464.
Amendment dated Nov. 24, 2008 filed in U.S. Appl. No. 11/167,464.
Advisory Action dated Dec. 10, 2008 issued in U.S. Appl. No. 11/167,464.
Request for Continued Examination dated Jan. 22, 2009 filed in U.S. Appl. No. 11/167,464.
Supplemental Amendment dated Feb. 3, 2009 filed in in U.S. Appl. No. 11/167,464.

* cited by examiner

SUPPORT SYSTEM FOR TRANSITION DUCTS

CROSS-REFERENCE TO RELATED APPLICATIONS

This application is a Continuation-In-Part of U.S. application Ser. No. 11/167,464 filed Jun. 27, 2005.

FIELD OF THE INVENTION

The invention relates in general to turbine engines and, more particularly, to transition ducts in the combustor section of a turbine engine.

BACKGROUND OF THE INVENTION

FIG. 1 shows an example of a combustion turbine engine 10. The turbine engine 10 includes a compressor section 12, a combustor section 14, and a turbine section 16. The combustor section 14 can include a plurality of combustors 15 (only one of which is shown) arranged in an annular array around a rotor 17. The turbine section 16 includes alternating rows of stationary airfoils 18 and rotating airfoils 20.

In operation, air is drawn in through the compressor section 12, where it is compressed and driven towards the combustor section 14. The compressed air 21 can be directed to the combustor 15 through an air intake 22. The air 21 can then be mixed with fuel to form an air/fuel mixture. In the combustor 15, the fuel/air mixture can be ignited to form a working gas. A duct 26 (sometimes referred to as a transition) can be provided for each combustor 15 to route the working gas to the turbine section 16.

Each transition duct 26 includes a transition body 28, an outer peripheral surface 33, an inlet end 30 and an exit end 32. The duct 26 further includes an outlet region 31 that includes the exit end 32. The transition duct 26 can be supported at various locations along its length. For example, the exit end 32 of the transition 26 can be supported to counter its own weight as well as to counter some of the forces imposed by the combustion gases flowing through the transition 26. In addition, the transition exit end 32 can be supported to allow proper alignment with the first row of stationary airfoils 18 in the turbine section 16.

One known support system 35 for the exit end 32 of each transition 26 is shown in FIG. 2. The system 35 is integral with each transition 26 and includes a support bracket 36 with seals 34. The support bracket 36 is provided at the exit end 32 of the transition 26 and is used to attach the transition 26 to a stationary structure 40 in the turbine section 16, such as a first stage blade ring or vane carrier 42 (see FIG. 1). The seals 34 can engage the stationary structure 40 in the turbine section 16. It should be noted that, when installed, the exit frame ring 37 associated with one transition 26 abuts the exit frame ring 37 associated with a neighboring transition 26, thereby forming an exit frame ring interface 38 between the two transition ducts 26.

Through experience, such a support system 35 has proven to have a number of drawbacks, particularly with respect to sealing. For instance, because the interface 38 of adjacent exit frame rings 37 lies between transitions 26, there is potential for compressed air from the combustor section to penetrate the interface 38 and enter the gas path of the turbine section 16, which can adversely affect engine performance and emissions. Similar sealing concerns occur at the interface between the exit end 32 of the transition 26 and the first stage of the stationary structure 40. Leakages at these interfaces are difficult to predict due to large tolerances and large transient deflections; thus, complicated sealing issues are introduced into the design of the support system 35. Very precise tolerances are required to set the exit end 32 of each transition 26 in place so that the seals 34 can properly engage the stationary structure 40 of the turbine section 16.

The known system 35 also includes relatively complex and wear prone subcomponents, requiring more expensive manufacturing and repair techniques and raising concerns of system downtime. Moreover, the known support system 35 suffers from large thermal stresses at support attachment locations, uses expensive components, and involves difficult and labor intensive assembly.

Thus, there is a need for a transition exit support system that can minimize the above concerns.

SUMMARY OF INVENTION

In one respect, aspects of the invention are directed to a transition duct support system. The system includes an outer span, an inner span, and a central column joining the outer span and the inner span such that lateral openings are defined on each side of the central column. The lateral openings can engage an inserted portion of a transition duct. In one embodiment, the outer span and the inner span can be arcuate. One or more braces extend from either the outer span or the inner span. The braces provide one or more mounting apertures.

A seal is provided along each lateral opening. The seal can be any of a number of seals including, for example, a rope seal or a spring leaf seal. The inner span, the outer span and the column can provide a channel extending along each lateral opening. In such case, the seal can be received within the channel. In one embodiment, a second seal can be provided along each lateral opening.

The system can further include a transition duct that has an outer peripheral surface. A portion of the transition duct can be received in one of the lateral openings such that the outer peripheral surface of the inserted portion of the transition duct substantially matingly engages the lateral opening and operatively engages the seal.

The system can further include a flexible seal operatively connected to at least a portion of each span. In one embodiment, the flexible seal can be substantially S-shaped.

In another respect, aspects of the invention relate to a system for supporting the exit end of a transition duct in a turbine engine. The system includes a support ring formed by a plurality of circumferentially arrayed support ring segments. Each support ring segment has an outer span and an inner span joined by a central column such that lateral openings are defined on each side of the central column. The lateral openings of neighboring support ring segments form a common opening.

The system also includes a transition duct. The transition duct has a body, an inlet and an outlet. A portion of the transition duct body is inserted into one of the common openings such that two neighboring ring segments substantially matingly engage the duct body. In one embodiment, one or more seals can be provided along each common opening to seal against the inserted transition duct body portion. The seal can be any suitable seal include, for example, a rope seal or a spring leaf seal.

Neighboring support ring segments define an interface. The interface occurs along an imaginary path across the outlet of the common transition duct body. As a result, leakage between adjacent transition duct bodies can be at least partially prevented.

The system can further include a stationary turbine engine support structure, such as a turbine first stage housing. At least two braces extend from each outer span. The braces can be used to connect the support ring segments to the support structure.

Each pair of neighboring support ring segments that define a common opening can include at least one brace extending from the outer span of the pair. Likewise, at least one post can be attached to the transition duct body. Each brace can be connected to a respective post by one or more fasteners. At least a portion of each post can be flexible.

The system can include at least one flexible seal. A flexible seal can be operatively connected to each of the spans of the support ring segments. Each flexible seal can bridge the interface between neighboring support ring segments.

In yet another respect, aspects of the invention are directed to a system for supporting the exit end of a transition duct in a turbine engine. The system includes a transition duct having a body, an inlet and an outlet. A pair of posts are provided on the transition duct body.

The system further includes a support ring formed by a plurality of circumferentially arrayed support ring segments. Each support ring segment has an outer span and an inner span joined by a central column such that lateral openings are defined on each side of the central column. Two braces extend from the outer span of each support ring segment. The lateral openings of neighboring support ring segments form a common opening. One or more seals, such as rope seals or spring leaf seals, are provided along the common opening. A flexible seal is operatively connected to each of the outer and inner span of at least one of the support ring segments. Thus, the flexible seal can at least partially minimize leakage between the support ring segment and the outlet.

A portion of the transition duct body is inserted into one of the common openings such that two substantially adjacent ring segments substantially matingly surround the duct body. The interface of neighboring support ring segments occurs along an imaginary path across the outlet of the common transition duct body. Thus, leakage between neighboring duct bodies can be at least partially prevented.

The system also includes a stationary turbine engine support structure. The two braces of each support ring segment are coupled to the support structure and the support posts. At least a portion of each of the posts can be flexible. In one embodiment, the stationary support structure can be a turbine first stage housing. Each support ring segment can be attached to the stationary support structure and the posts by, for example, bolts.

DETAILED DESCRIPTION OF THE INVENTION

Embodiments of the invention are directed to a transition duct support system. Aspects of the invention will be explained in connection with a system for supporting the exit end of a transition duct, but the detailed description is intended only as exemplary. Embodiments of the invention are shown in FIGS. 3-8, but the present invention is not limited to the illustrated structure or application.

Figure 3:
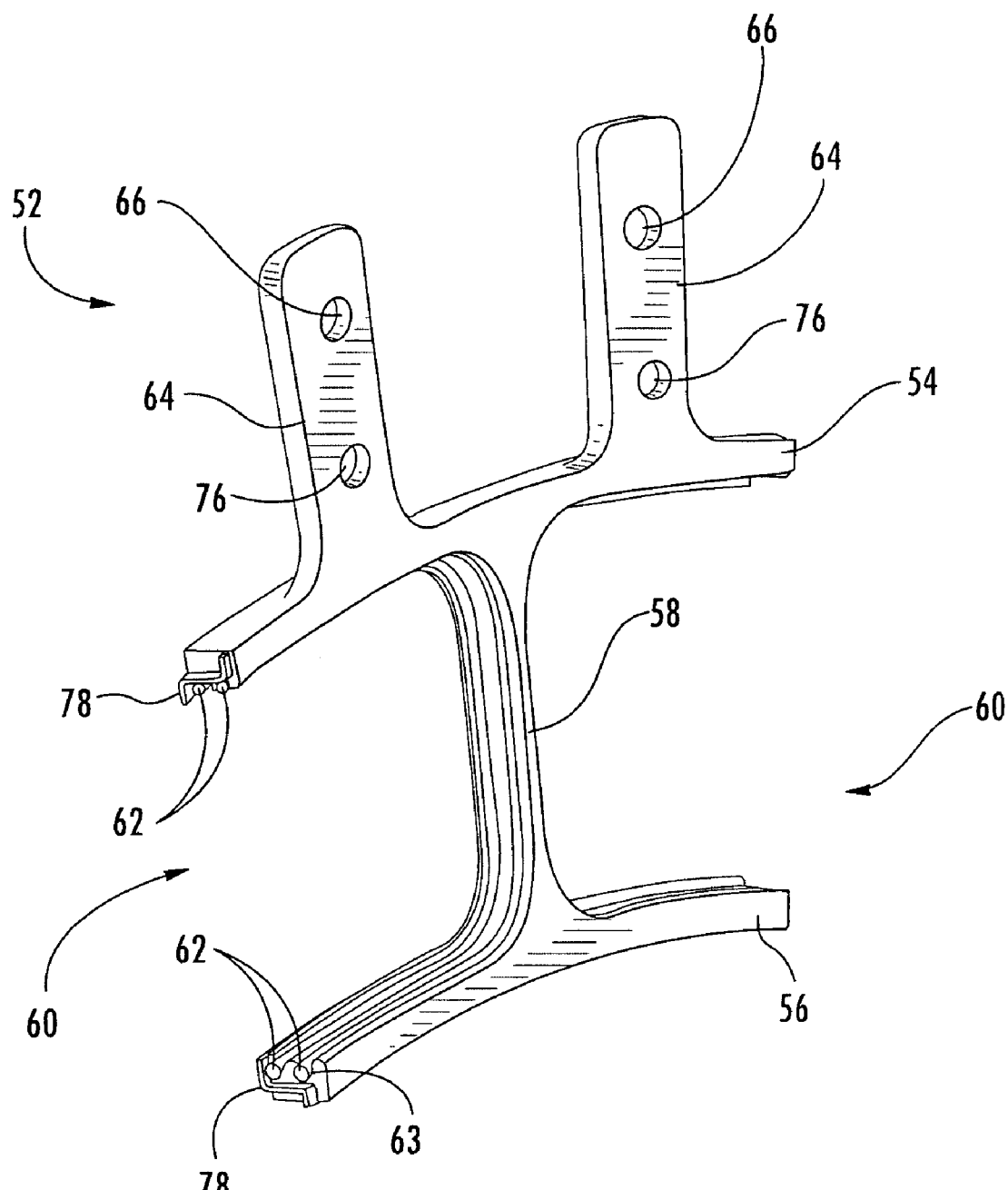
FIG. 3 is an isometric view of a support ring segment according to aspects of the invention.

A transition exit support system according to aspects of the invention includes a plurality of exit support ring segments. FIG. 3 shows an individual exit support ring segment 52. Each support ring segment 52 can have an outer span 54 and an inner span 56. In one embodiment, the outer and inner spans 54, 56 can be generally arcuate. The arcuate outer and inner spans 54, 56 can be substantially concentric. The spans 54, 56 can be joined by a central column 58 to define a lateral opening 60 on each side of the central column 58. The spans 54, 56 and the central column 56 can be made of a wide range of materials including metals. In one embodiment, the spans 54, 56 and the central column 58 can be unitary, such as by casting or by cutting these features from a single piece of material. Alternatively, the spans 54, 56 and the central column 58 can be integral, such as by welding, fasteners, mechanical engagement, just to name a few possibilities.

A portion of the exit end 32 and/or outlet region 31 of one of the transition ducts 26 can be received in the opening 60. It will be appreciated that the spans 54, 56 and the column 58 can be shaped and contoured to substantially matingly engage the outer peripheral surface 33 of the inserted portion of the transition duct 26. For example, the opening 60 can be substantially semi-circular or substantially rectangular.

Figure 6:
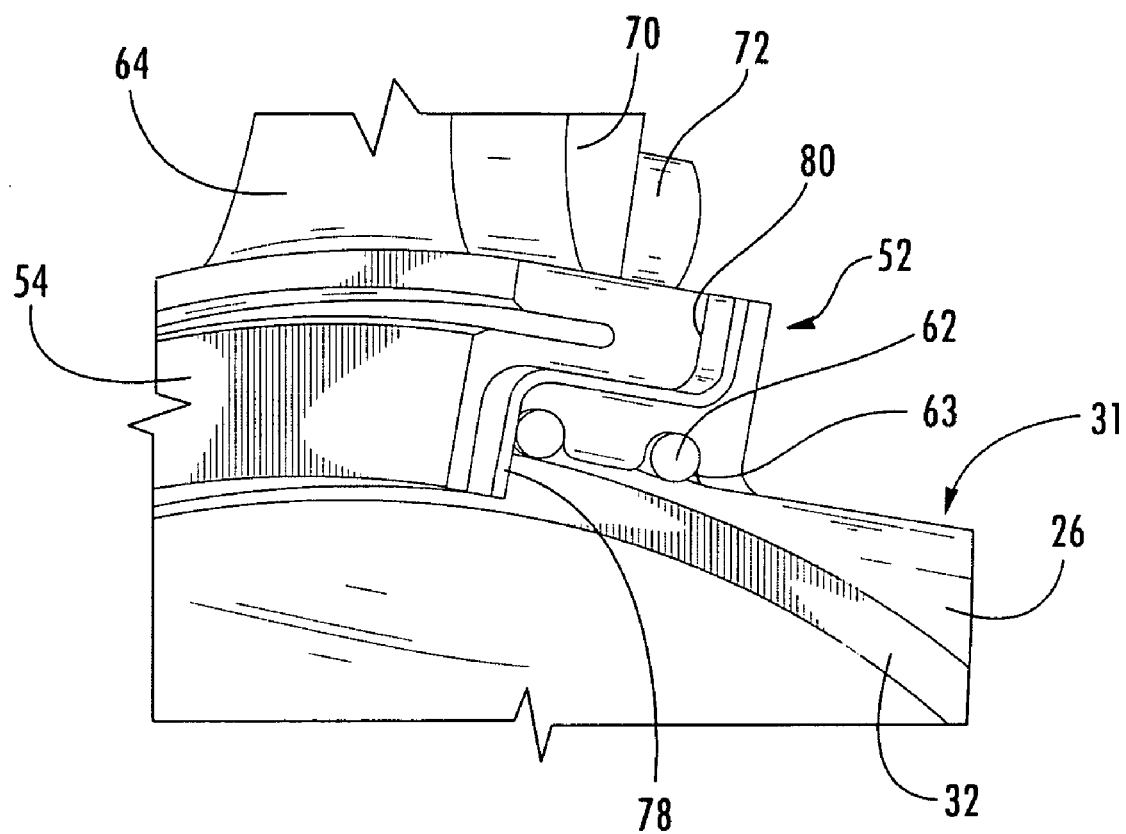
FIG. 6 is a close up front view of the engagement between the support ring segment and the exit end of the transition exit duct.

Further, as shown in FIGS. 3 and 6, the spans 54, 56 and the column 58 of the support ring segment 52 can provide one or more seals 62 along each lateral opening 60 to seal against the outer peripheral surface 33 of the inserted portion of the transition duct 26. Such seals can minimize the migration of compressor air from the combustor section 14 to the turbine section 16 through any space between the outer peripheral surface 33 of the transition duct 26 and the opening 60. The seals 62 can also dampen vibrations that can develop during engine operation. The seal 62 can be any suitable seal including, for example, a rope seal or a spring leaf seal. Each seal 62 can be a continuous piece, or it can be formed by a plurality of segments that are joined or are in abutting relation. The seals 62 can be made of any material and can have any of a number of cross-sectional shapes. Preferably, each seal 62 can be received in a groove 63 provided in the lateral opening 60 of the support ring segment 52.

There can be any number of seals 62. In one embodiment, a single seal 62 can be used. In another embodiment, at least two seals 62 can be provided. In the case of multiple seals 62, the seals 62 can be arranged in substantially parallel rows along each lateral opening 60. However, at least one of the seals 62 can be non-parallel to the other seals 62.

The support ring segment 52 can include support legs, such as braces 64, that that extend out of at least one of the spans 54, 56. The braces 64 can be unitary with the respective span 54, 56, or they can be integrated such as by welding, fasteners or other mechanical engagement, just to name a few possibilities. Preferably, there are at least two braces 64. The braces 64 or other support legs are preferably dimensioned and constructed of high strength material to provide bearing support to primarily circumferential loads.

Figure 7:
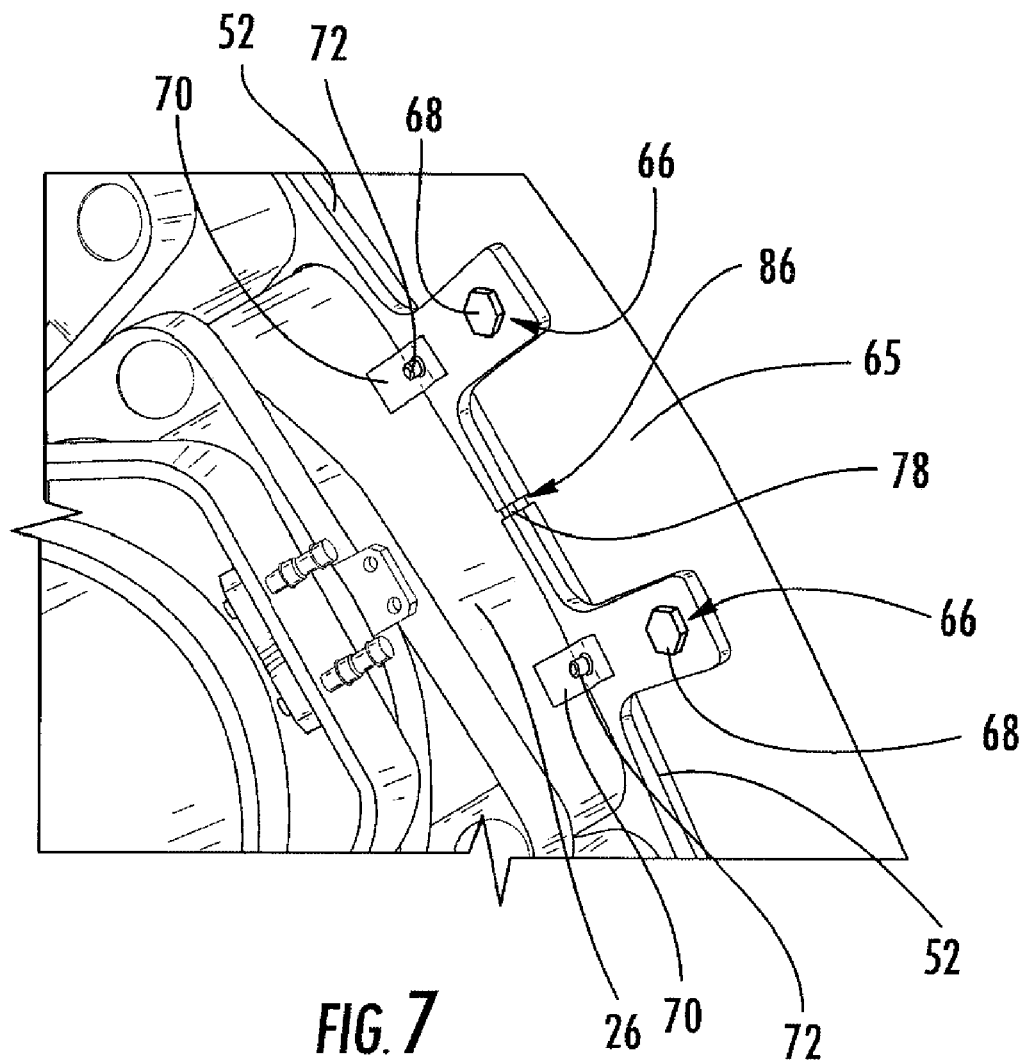
FIG. 7 is a rear view of the engagement between the exit support and the exit end of the transition exit duct.

The braces 64 can be used to couple the support ring segment 52 to a fixed structure in the engine 10. For instance, the braces 64 can be attached to a nearby stationary support structure 65 in the turbine section 16, as shown in FIG. 7. Alternatively, the braces 64 can be attached to a nearby stationary support structure (not shown) in the combustor section 14. In one embodiment, the braces 64 can extend radially outwardly from the outer span 54 to couple to a radially outer stationary structure 40 of the first stage housing, such as a blade ring or a vane carrier 42. Alternatively or in addition, the braces 64 can extend radially inwardly from the inner span to affix to a radially inward support structure of the first stage housing. It should be noted that the terms "radially" as used herein means relative to the turbine.

The braces 64 can provide apertures 66 or other mounting structure to facilitate coupling to the surrounding stationary structure 65. The apertures 66 can be provided in the braces 64 by, for example, conventional machining methods. In one embodiment, the braces 64 can be coupled to the stationary support structure 65 by bolts 68 or other fasteners, which can pass through and/or engage the apertures 66 in the braces 64.

Figure 4:
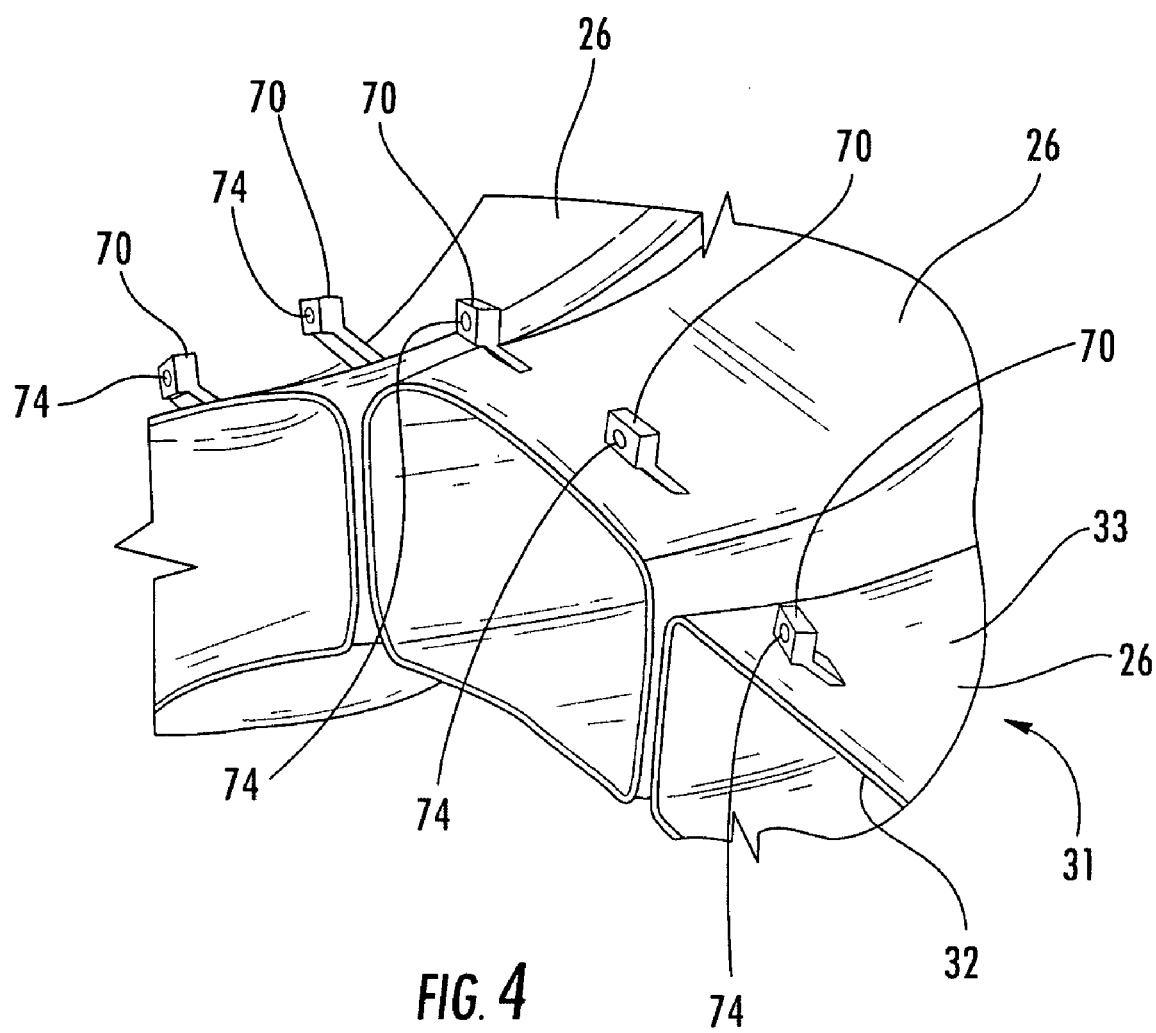
FIG. 4 is an isometric view of the exit ends of a plurality of neighboring transition ducts according to aspects of the invention, wherein the transition ducts including mounting posts for attachment to the support ring segment.

The support ring segment 52 can also be attached to the transition duct 26, which can dampen vibrational responses of the transition duct 26. There are various ways in which the support ring segment 52 and the duct 26 can be coupled. For instance, as shown in FIG. 4, the outlet region 31 of each transition duct body 28 can be equipped with posts 70 to which the braces 64 can be mounted. The posts 70 can be connected to the outer peripheral surface 33 of the transition duct 26 by, for example, fasteners. In one embodiment, bolts 72 or other fasteners can be used to attach the braces 64 and the posts 70. In such case, the posts 70 can provide apertures 74, which can be threaded apertures. Corresponding pass-through apertures 76 can be provided in the braces 64. The posts 70 can be rigid, but, preferably, at least a portion of the posts 70 is flexible to accommodate relative movement between the transition duct 26, the support ring segment 52 and/or the stationary support structure 65.

Figure 5:
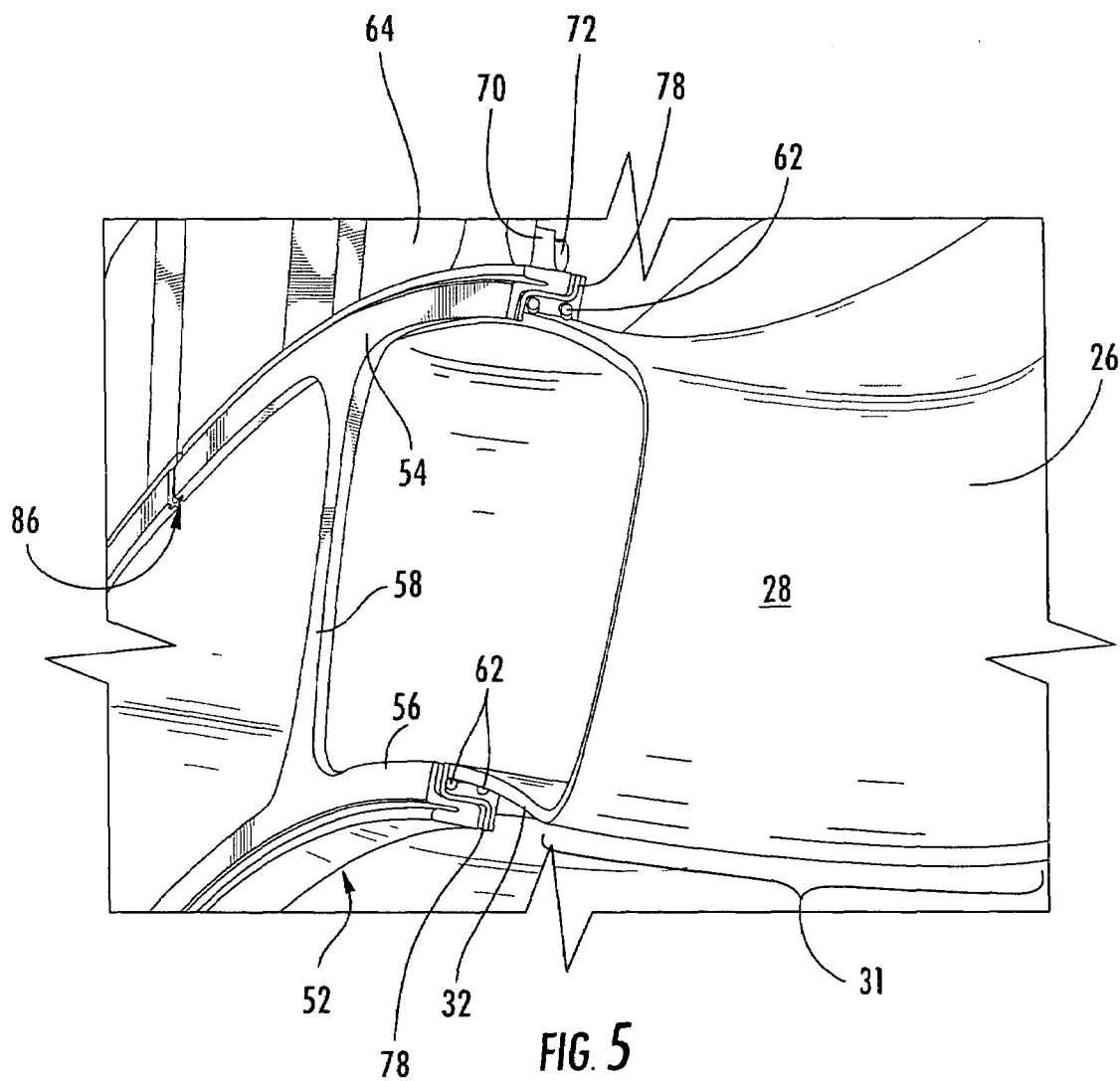
FIG. 5 is an isometric view of the exit ends of a plurality of neighboring transition ducts, showing the exit ends engaging a support ring assembly according to aspects of the invention.

The support ring segment 52 according to aspects of the invention can also include a flexible seal 78. In one embodiment, a portion of the flexible seal 78 can engage a portion of the exit end 32 of the transition duct 26, as shown in FIGS. 5 and 6. The flexible seal 78 can provide further protection against the infiltration of compressed air into the hot gas path in the turbine section 16. The flexible seal 78 can have any of a number of shapes and configurations. In one embodiment, the flexible seal 78 can be serpentine so as to create a tortuous route for the compressed air. For instance, the flexible seal 78 can be generally S-shaped. The flexible seal 78 can be made of any suitable material including, for example, metal.

The flexible seal 78 can be operatively associated with at least one of the outer and inner spans 54, 56. The spans 54, 56 can include channels 80 to receive and retainably engage the flexible seal 78 through frictional engagement. Alternatively or in addition, the flexible seal 78 can be attached to the respective span by fasteners, such as stakes. For each span 54, 56, there can be a single flexible seal 78 or a plurality of substantially abutting flexible seal segments. The flexible seal 78 can extend the full length of the span or just a portion thereof. In one embodiment, a portion of the flexible seal 78 can extend beyond at least one of the ends of the span 54, 56. The extending portion can be received by an adjacent support ring segment 52. The flexible seal 78 can extend across two or more adjacent support ring segments 52.

Having described the individual components of the transition exit support system according to aspects of the invention, one manner of assembling the system will now be described. The following text is merely one example of the various ways in which the system can be assembled.

Each support ring segment 52 can be installed in the engine in various ways. For example, each support ring segment 52 can be aligned with and coupled to the stationary structure 65 in the engine 10 to hold each support ring segment 52 in place. In one embodiment, the braces 64 of each exit ring segment 52 can be attached to the first stage stationary support structure, such as the vane carrier 42, by bolts or other fasteners. As each support ring segment 52 or a group of adjacent support ring segments 52 are installed, the flexible seals 78 can be installed by sliding it into the receiving channel 80 in one or more support ring segments 52.

Figure 8:
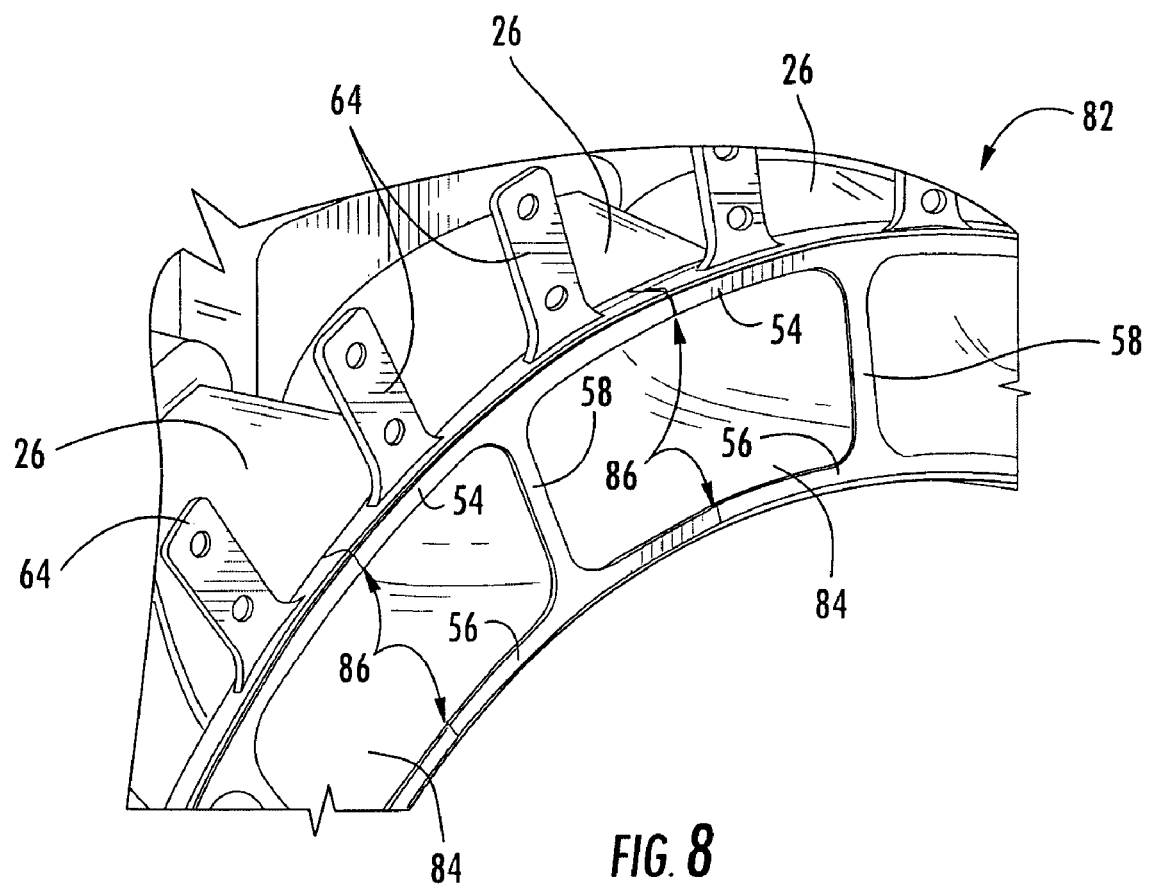
FIG. 8 is an isometric view of a portion of the transition duct support system according to aspects of the invention.

When all of the support ring segments 52 are installed, they can collectively form an annular support ring 82, a portion of which is shown in FIG. 8. The lateral openings 60 of two adjacent support ring segments 52 can cooperate to form a single opening 84. If provided, the grooves 63 in the lateral openings 60 of two adjacent support ring segments 52 can be substantially aligned to form a single substantially continuous groove along the opening 84. The seals 62 can then be positioned in the grooves 63 so as to be retained therein, such as by being sandwiched between the walls of the grooves 63. Adhesives can be provided in the grooves 63 to temporarily hold the seals 62 in place during assembly.

Figure 1:
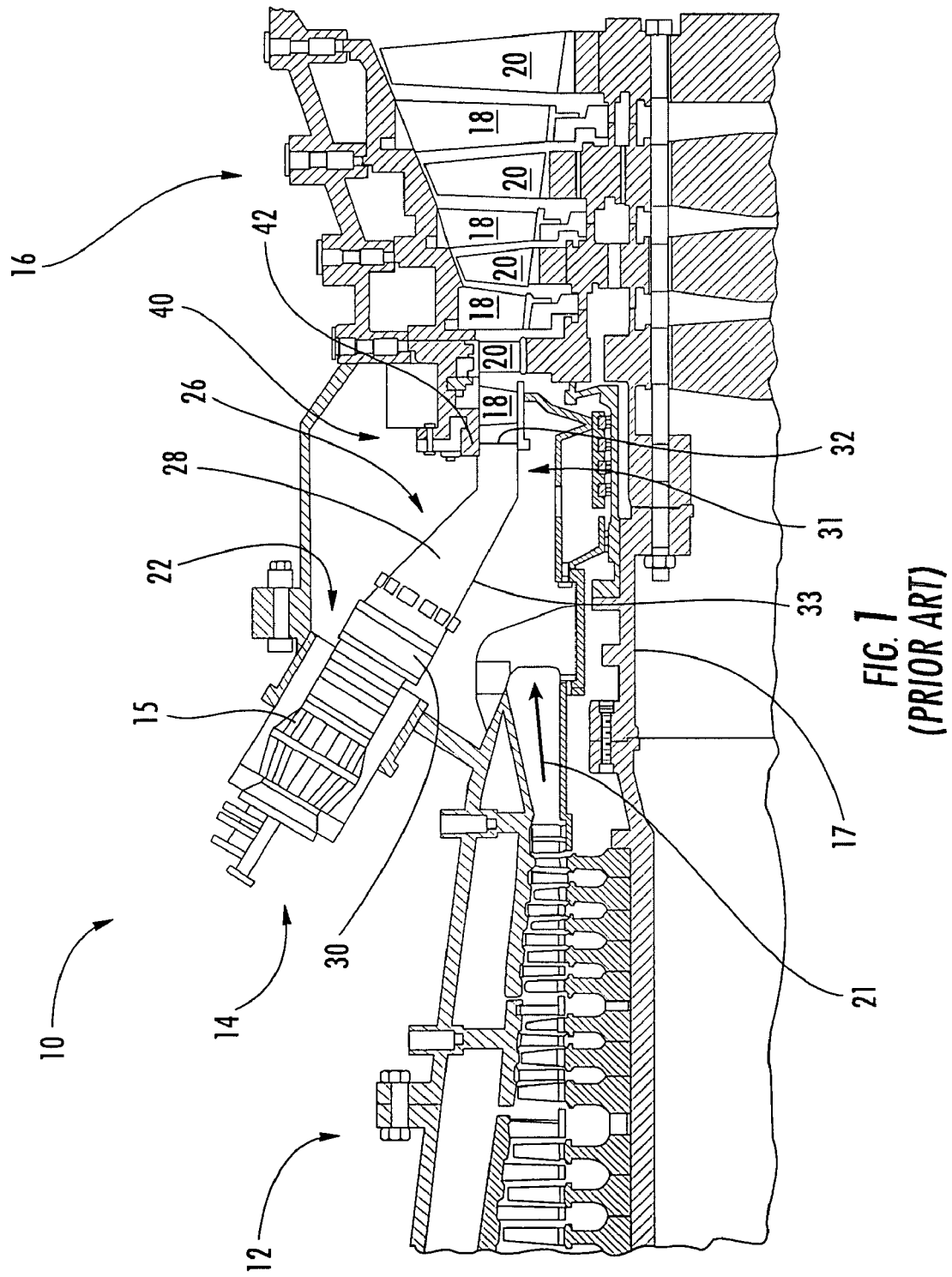
FIG. 1 is a cross-sectional view of a portion of a known combustion turbine engine.
Figure 2:
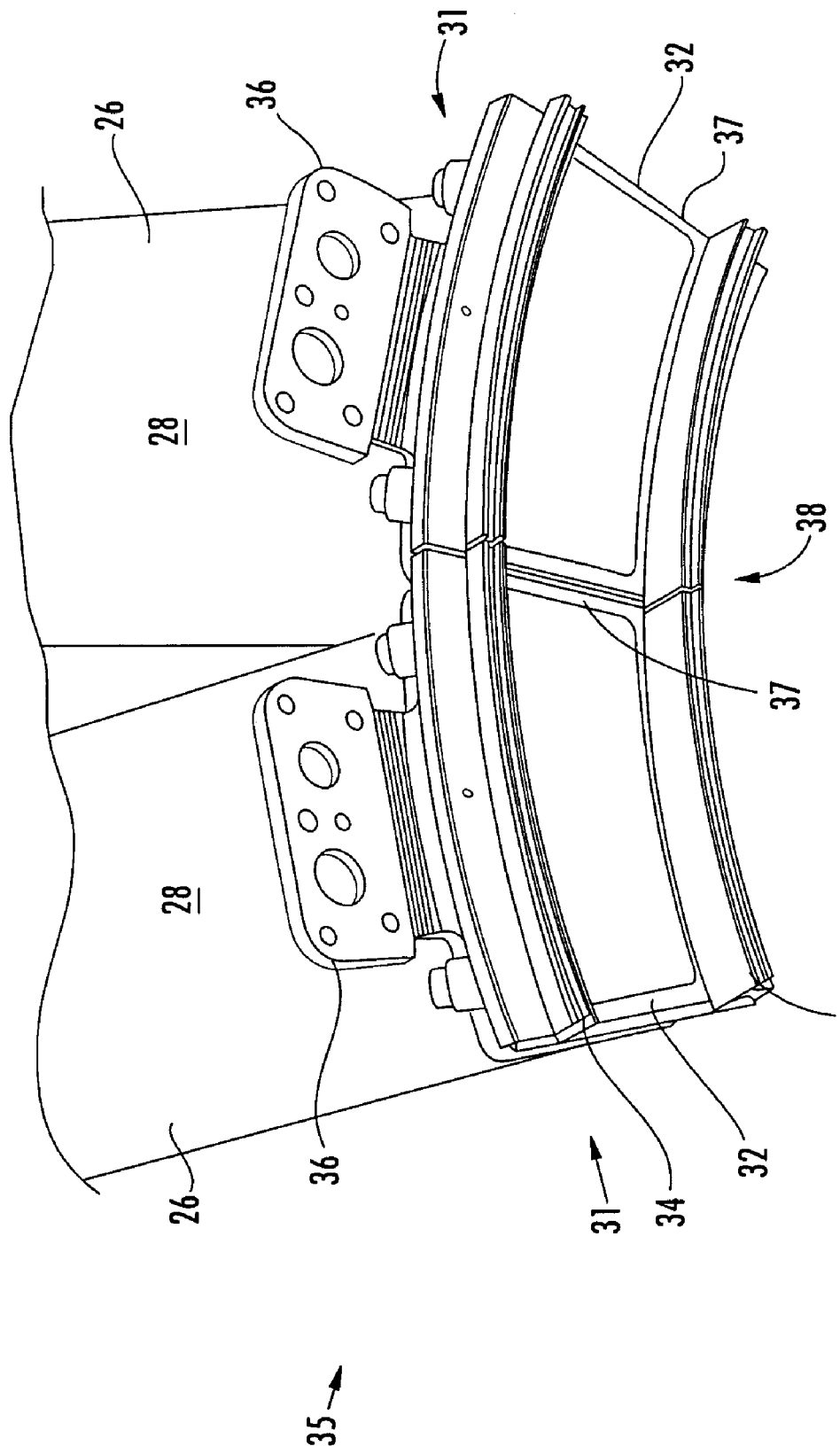
FIG. 2 is an isometric view of a known system for supporting the exit end of a transition duct.

It should be noted that the above-described steps can be performed without any of the transition ducts 26 being in place. Thus, plenty of workspace is available during the installation of the support ring segments 52. Further, an installer can perform the above steps without having the burden of substantially simultaneously supporting the duct with the integral exit support and operatively positioning the duct/exit support assembly as well as the seals onto the turbine first stage housing, as was necessary with the known support system 35 described earlier in connection with FIG. 2. In the system according to aspects of the invention, the transition duct 26 can be brought into engagement with the support ring 82 and seals, which have already been assembled on the turbine stationary support structure 65.

According to aspects of the invention, the outlet region 31 of the transition duct 26 can be inserted into a respective opening 84 of the support ring assembly 82. Thus, two adjacent ring segments 52 can enclose a common transition duct body 28 so that the inserted portion of the common transition duct body 28 is substantially surrounded. The outer and inner spans 54, 56 of adjacent ring segments 52 meet at an interface 86. The interface 86 occurs along an imaginary line or path across the exit end 32 of the common transition duct body 28.

The transition duct 26 can be coupled to each of the adjacent ring segments 52 that form the opening 84 in which the duct 26 is received. For instance, the braces 64 of the support ring segments 52 can be bolted to the fastener posts 70 on the transition duct body 28. Due to the dampening that can be provided by the seals 62, it is expected that only two attachment points are needed between each duct 26 and the two support ring segments 52. Aside from the outlet region 31, other portions of the transition duct 26 can be supported in any of various known manners.

During engine operation, the support ring assembly 82 can support the outlet region 31 of each transition duct 26. The support ring assembly 82 can counter the weight of the transition duct 26 as well as the forces imparted by the gases passing through the duct 26. The support ring assembly 82 can provide several other benefits in addition to the benefits already described. For example, manufacturing ease and repeatability can be facilitated because there are no side seals to install or exit clearances to check. Thus, installation and removal times can be appreciably reduced. Further, the system according to aspects of the invention has fewer failure prone parts, compared to the known support system.

The support ring assembly 82 according to aspects of the invention can also assist in reducing longitudinal leakage through the interface 86 of adjacent ring segments 52. It will be appreciated that the overall length of the interface 86 can be less than the interface 38 of the known support system. Moreover, the sealing between the support ring assembly 82 and the transition duct 26 can be predetermined and not dependent on assembly gaps. Further, it is expected that any leakage through the interface 86 should be less than the leakage and dedicated cooling at the known interface 38 between transitions 26. Any gaps in the interface 86 can be substantially sealed by appropriate bridging material. In one embodiment, the interface 86 can be substantially sealed at least in part by the flexible seal 78, which, as noted above, can extend across more than one support ring segment 52. A reduction in the amount of compressed air entering the turbine gas path can result in improved engine performance, such as lower NOx emissions.

The foregoing description is provided in the context of one possible support system for the outlet region and the exit end of a turbine transition duct. It will be appreciated that the support system can readily be used to provide support to any portion of the transition duct and is not limited to the exit end. Thus, it will of course be understood that the invention is not limited to the specific details described herein, which are given by way of example only, and that various modifications and alterations are possible within the scope of the invention as defined in the following claims.

What is claimed is:

1. A transition duct support system comprising:
   an outer span;
   an inner span;
   at least one brace extending from one of the outer span and the inner span, wherein the brace provides one or more mounting apertures;
   a central column joining the outer span and the inner span such that a first lateral opening is defined on one side of the central column and a second lateral opening is defined on an opposite side of the central column, wherein a portion of the inner span, a portion of the outer span and a first side of the column provide a first channel extending along the first lateral opening, wherein a portion of the inner span, a portion of the outer span and a second side of the column provide a second channel extending along the second lateral opening, whereby the first lateral opening can engage an inserted portion of a first transition duct and the second lateral opening can engage an inserted portion of a second transition duct;
   a first seal provided along the first lateral opening and being at least partially received in the first channel, whereby the first seal can seal against the inserted portion of the first transition duct; and
   a second seal provided along the second lateral opening and being at least partially received in the second channel, whereby the second seal can seal against the inserted portion of the second transition duct.

2. The system of claim 1 further including a first transition duct having an outer peripheral surface, wherein a portion of the first transition duct is received in the first lateral opening such that the outer peripheral surface of the inserted portion of the first transition duct substantially matingly engages the first lateral opening and operatively engages the first seal.

3. system of claim 1 wherein the first seal and the second seal are one of rope seals and spring leaf seals.

4. The system of claim 1 further including a third seal provided along the first lateral opening, whereby the third seal can seal against the inserted portion of the first transition duct; and
   a fourth seal provided along the second lateral opening, whereby the fourth seal can seal against the inserted portion of the second transition duct.

5. The system of claim 1 further including a first flexible seal operatively connected to at least a portion of the outer span; and a second flexible seal operatively connected to at least a portion of the inner span.

6. The system of claim 5 wherein the first and second flexible seals are substantially S-shaped.

7. The system of claim 1 wherein the outer span and the inner span are arcuate.

8. A system for supporting the exit end of a transition duct in a turbine engine comprising:
   a support ring formed by a plurality of circumferentially arrayed support ring segments, each support ring segment having an outer span and an inner span joined by a central column such that lateral openings are defined on each side of the central column, the lateral openings of neighboring support ring segments forming a common opening;
   a transition duct having a body, an inlet and an outlet, a portion of the transition duct body being inserted into one of the common openings such that two neighboring support ring segments substantially matingly engage the duct body, wherein neighboring support ring segments define an interface that occurs along an imaginary path across the outlet of the common transition duct body, and
   a flexible seal operatively connected to at least one of the inner and outer spans of each support ring segment, wherein the flexible seal extends along at least a portion of the respective span and bridges the interface between neighboring support ring segments, wherein the flexible seal engages a portion of the outlet of the transition duct, wherein the flexible seal is serpentine,
   whereby leakage between adjacent transition duct bodies is at least partially prevented.

9. The system of claim 8 further including at least one seal provided along each common opening to seal against the inserted transition duct body portion.

10. The system of claim 8 further including a stationary turbine engine support structure, wherein at least two braces extend from each outer span and connect to the support structure.

11. The system of claim 10 wherein the stationary structure is a turbine first stage housing.

12. The system of claim 8 wherein each pair of neighboring support ring segments that define a common opening includes at least one brace extending from the outer span of the pair, wherein at least one post is attached to the transition duct body, and wherein each brace is connected to a respective post by at least one fastener.

13. The system of claim 12 wherein at least a portion of each post is flexible.

14. A system for supporting the exit end of a transition duct in a turbine engine comprising:
   a transition duct having a body, an inlet and an outlet, wherein a pair of posts are provided on the transition duct body;

a support ring formed by a plurality of circumferentially arrayed support ring segments, each support ring segment having an outer span and an inner span joined by a central column such that lateral openings are defined on each side of the central column, wherein two braces extend from each outer span, wherein the lateral openings of neighboring support ring segments form a common opening along which at least one seal is provided, wherein a flexible seal is operatively connected to each of the spans of at least one of the support ring segments, whereby leakage between the support ring segment and the outlet is at least partially minimized, wherein a portion of the transition duct body is inserted into one of the common openings such that two substantially adjacent ring segments substantially matingly surround the duct body and the interface of substantially adjacent ring segments occurs along an imaginary path across the outlet of the common transition duct body, whereby leakage between adjacent transition duct bodies is at least partially prevented, and a stationary turbine engine support structure, wherein the two braces of each support ring segment are coupled to the support structure and the support posts.

15. The system of claim 14 wherein at least a portion of each of the posts is flexible.

16. The system of claim 14 wherein each support ring segment is attached to the stationary support structure and the posts by bolts.

17. system of claim 14 wherein the stationary support structure is a turbine first stage housing.

* * * * *